(12) United States Patent
Qiao et al.

(10) Patent No.: US 12,552,431 B1
(45) Date of Patent: Feb. 17, 2026

(54) SEPARABLE LIFTABLE DOUBLE-DECK WAGON

(71) Applicant: Wuyi Shanqiu Leisure Products Co., Ltd., Jinhua (CN)

(72) Inventors: Chenfei Qiao, Jinhua (CN); Jianqiu Hu, Jinhua (CN)

(73) Assignee: Wuyi Shanqiu Leisure Products Co., Ltd., Jinhua (CN)

( * ) Notice: Subject to any disclaimer, the term of this patent is extended or adjusted under 35 U.S.C. 154(b) by 0 days.

(21) Appl. No.: 19/330,800

(22) Filed: Sep. 16, 2025

(30) Foreign Application Priority Data

Sep. 1, 2025   (CN) .......................... 202521871839.2

(51) Int. Cl.
*B62B 3/02* (2006.01)
(52) U.S. Cl.
CPC ............ *B62B 3/02* (2013.01); *B62B 2205/06* (2013.01)
(58) Field of Classification Search
CPC ............................... B62B 3/02; B62B 2205/06
See application file for complete search history.

(56) References Cited

U.S. PATENT DOCUMENTS 10,272,937 B2 * 4/2019 Chen ...................... B62B 5/0003
2021/0332607 A1 * 10/2021 Goldszer ................... B62B 3/02

* cited by examiner

*Primary Examiner* — Jason D Shanske
*Assistant Examiner* — James J Triggs
(74) *Attorney, Agent, or Firm* — Birchwood IP

(57) ABSTRACT

A separable liftable double-deck wagon includes two front main rods and two rear main rods, top fixing members are fixed to tops of the front and rear main rods, and bottom fixing members are fixed to bottoms of the front and rear main rods. The front and rear main rods are sequentially provided with fixed connecting members and slidable connecting members from top to bottom. A front-rear folding rod assembly is arranged between the front and rear main rods, rod ends of the front-rear folding rod assembly are pivotally connected to the top fixing members and the slidable connecting members, respectively. One respective side folding rod assembly is arranged between the front main rods and between the two rear main rods. Upper and lower folding rod assemblies are arranged from top to bottom in a rectangular space defined by the four main rods.

9 Claims, 5 Drawing Sheets

SEPARABLE LIFTABLE DOUBLE-DECK WAGON

CROSS-REFERENCE TO RELATED APPLICATIONS

This application claims priority to Chinese Patent Application No. 202521871839.2, filed on Sep. 1, 2025, which is hereby incorporated by reference in its entirety.

TECHNICAL FIELD

The present disclosure relates to the field of outdoor wagons, and in particular to a separable liftable double-deck wagon.

BACKGROUND

Wagons are easy to use and relatively lightweight, allowing them to function in areas where motor vehicles cannot be used easily. They are particularly convenient for short-distance transportation of light items. A common four-wheel wagon generally includes a single cargo platform. Double-deck wagons are now available to increase the load-bearing capacity.

To facilitate storage, most wagons adopt a folding structure composed of a plurality of scissor rods. When this folding structure is applied to a double-deck wagon, a foldable double-deck wagon is obtained. However, the scissor rods cause a top of the wagon to rise, thereby requiring a large storage space. Therefore, slidable sleeves capable of moving vertically are provided at junctions of the scissor rods on both sides to ensure that the top of the wagon does not rise during folding and storage. Nevertheless, these slidable sleeves inevitably reduce load-bearing capacity of the upper loading platform, compromising its overall structural stability.

In order to address the problem that the wagon takes up excessive storage space when idle, the industry generally adopts a folding structure consisting of a plurality of scissor rods. By rotating and folding the scissor rods, this design allows the wagon to collapse completely, thereby significantly reducing storage volume and improving storage convenience. This folding structure is applied to a foldable double-deck wagon, further improving the wagon's flexibility. However, this design has a critical technical limitation: when the scissor rods are folded, intersection points cause the top of the wagon to rise synchronously. Even after folding, the wagon still has an overall storage height, failing to fully achieve the desired compact storage effect.

To address the problem of the increased height after folding, the prior art introduces slidable sleeves at connection points of the scissor rods on both sides. The slidable sleeves can move in an axial direction of the scissor rods; during folding, positions of the intersection points are adjusted to prevent the top of the wagon from further rising during folding, effectively controlling the storage height of the wagon. However, the design of the prior art still has the following technical problems: the load-bearing capacity and structural stability of the upper loading platform rely heavily on the rigidity of a scissor rod connection structure. The introduction of slidable sleeves disrupts the original rigid connection of the scissor rods, causing the upper loading platform to become susceptible to shaking and deformation under load, significantly reducing its load-bearing capacity and making it difficult to meet basic requirements of stability and load-bearing capacity in daily transport of goods.

Therefore, a technical problem to be solved by the present disclosure is how to ensure that a top portion of a double-deck wagon does not rise after folding, thereby maintaining its compact storage characteristics, while ensuring that the upper loading platform maintains sufficient load-bearing strength and structural stability.

SUMMARY

To overcome the deficiencies of the prior art, an objective of the present disclosure is to provide an outdoor folding wagon a top of which does not rise and remains compact after folding while offering load-bearing strength and structural stability.

A technical solution adopted by the present disclosure is: a separable liftable double-deck wagon, which includes two front main rods and two rear main rods, and the four main rods together define a rectangular space. Top fixing members are fixed to tops of the front main rods and the rear main rods, and bottom fixing members are fixed to bottoms of the front main rods and the rear main rods. The front main rods and the rear main rods are sequentially provided with fixed connecting members and slidable connecting members from top to bottom, and the slidable connecting members are configured to slide up and down along rod walls of the front main rods and the rear main rods. A front-rear folding rod assembly is arranged between the front main rods and the rear main rods, rod ends of the front-rear folding rod assembly are pivotally connected to the top fixing members and the slidable connecting members, respectively. A respective side folding rod assembly is arranged between the two front main rods and between the two rear main rods, and rod ends of the side folding rod assembly are pivotally connected to the top fixing members and the slidable connecting members, respectively. An upper folding rod assembly and a lower folding rod assembly are sequentially arranged from top to bottom in the rectangular space defined by the four main rods, rod ends of the upper folding rod assembly are pivotally connected to the fixed connecting members, and rod ends of the lower folding rod assembly are pivotally connected to the bottom fixing members.

During unfolding, the slidable connecting members slide upward, the front-rear folding rod assembly and the side folding rod assembly are driven to rotate and unfold about the top fixing members, and the lower folding rod assembly is rotated about the bottom fixing members to naturally unfold, forming a double-layer load-bearing space. During folding, the slidable connecting members are pulled downward, each folding rod assembly is driven to rotate about its connection points and collapsed into a compact state. A coordinated structure of the main rods, the sliding members, and the folding rod assemblies enables rapid unfolding and folding of the wagon. A rectangular main rod frame provides stable support for the double-layer load-bearing structure, preventing shaking after unfolding, while ensuring both convenient collapsing and load-bearing stability.

In some embodiments, the front-rear folding rod assembly includes a first front-rear folding rod and a sixth front-rear folding rod, as well as a third front-rear folding rod and an eighth front-rear folding rod. The first front-rear folding rod and the sixth front-rear folding rod are connected in a V-shape, the third front-rear folding rod is pivotally riveted to the first front-rear folding rod, and the eighth front-rear folding rod is pivotally riveted to the sixth front-rear folding rod. The pivotal rivet connection allows rotation about the pivot joints. During unfolding, upward sliding of the slidable connecting members drives the third front-rear folding rod and the eighth front-rear folding rod to rotate, which in turn pulls the first front-rear folding rod and the sixth front-rear folding rod to unfold about the top fixing members. The V-shaped connection structure can distribute the stress, preventing overloading of a single rod. During folding, the rods rotate in opposite directions about the pivot joints and collapse fit snugly against the main rods. The pivotal rivet connection ensures the flexibility of folding, and the V-shaped connection enhances structural strength in a front-to-rear direction, preventing deformation of the front-rear folding rod assembly under loading and improving the load-bearing capacity of the upper loading platform.

In some embodiments, the front-rear folding rod assembly further includes a second front-rear folding rod connected in an X-shape to the first front-rear folding rod, and a fifth front-rear folding rod connected in an X-shape to the sixth front-rear folding rod. The second front-rear folding rod and the fifth front-rear folding rod are connected in an inverted V-shape. A fourth front-rear folding rod is pivotally riveted between the second front-rear folding rod and the third front-rear folding rod, and a seventh front-rear folding rod is pivotally riveted between the fifth front-rear folding rod and the eighth front-rear folding rod. The X-shaped connections form cross-support between the first front-rear folding rod and the fifth front-rear folding rod, as well as between the fifth front-rear folding rod and the sixth front-rear folding rod, and the inverted V-shaped connection further strengthens the middle structure. During unfolding, the fourth front-rear folding rod and the seventh front-rear folding rod rotate synchronously with adjacent rods, forming a multi-joint linkage support. During folding, the crossed rods rotate about the X-shaped junctions and pivot joints to prevent jamming among the rods. This multi-rod cross linkage significantly enhances torsional and bending resistance of the front-rear folding rod assembly, ensuring that even when heavy items are placed on the upper loading platform, the structure can be prevented from shifting in the front-to-rear direction, while pivotal rivets among a plurality of joints ensure smooth folding without the risk of jamming.

In some embodiments, the side folding rod assembly includes a first side folding rod and a second side folding rod connected to the top fixing members, as well as a third side folding rod and a fourth side folding rod connected to the slidable connecting members. During unfolding, upward sliding of the slidable connecting members drives the third side folding rod and the fourth side folding rod to rotate and separate along their pivot joints, simultaneously pulling the first side folding rod and the second side folding rod to rotate and unfold about the top fixing members, forming a side support structure. During folding, downward sliding of the slidable connecting members drives the side folding rods to rotate about their connection points and collapse along the front main rods or the rear main rods. The side folding rod assembly fills a lateral space between the two main rods, preventing items from sliding off an unsupported side of the loading platform after unfolding. The rods can be fully collapsed at the same time without increasing the storage volume after folding.

In some embodiments, the first side folding rod and the second side folding rod are connected in a V-shape, the third side folding rod and the fourth side folding rod are connected in an inverted V-shape, and the first side folding rod and the third side folding rod, as well as the second side folding rod and the fourth side folding rod are connected in an X-shape, respectively. The V-shaped and inverted V-shaped connections form a support structure with a high center and low ends after unfolding. Combined with the X-shaped cross connection, lateral force is distributed to the top fixing members and the slidable connecting members. During folding, the X-shaped crossed rods rotate about the junctions, and the V-shaped and inverted V-shaped structure collapse synchronously, minimizing a space occupied by the rods. The structure combined X-shaped connection and V-shaped connection significantly enhances a lateral load-bearing strength of the side folding rod assembly, preventing the wagon from tilting caused by lateral force. The compact folding design makes the wagon convenient for storage without protrusions on the sides after folding.

In some embodiments, the upper folding rod assembly includes a first upper folding rod, a second upper folding rod, a third upper folding rod and a fourth upper folding rod that are pivotally connected to the four fixed connecting members, an upper connecting member is arranged at an intersection center of the first upper folding rod, the second upper folding rod, the third upper folding rod and the fourth upper folding rod, and the upper connecting member is configured to restrict the four upper folding rods to rotate only downward. During unfolding, the four upper folding rods rotate upward the fixed connecting members and the upper connecting member until the rods are horizontal to form a support frame for the upper loading platform. Since the upper connecting member restricts the rods to rotate only downward, the rods after unfolded are prevented from collapsing, ensuring the stability of loading. During folding, the upper loading platform is pressed downward, and the rods rotate upward and collapse about the upper connecting member. The unidirectional limit design of the upper connecting member prevents the upper loading platform from collapse under load or vibration, ensuring the loading safety. A frame structure formed by the four cross-connected rods can distribute the weight of items evenly, increasing the upper load-bearing capacity of the upper loading platform.

In some embodiments, the lower folding rod assembly includes a first lower folding rod, a second lower folding rod, a third lower folding rod and a fourth lower folding rod that are pivotally connected to the four bottom fixing members, a lower connecting member is arranged at an intersection center of the first lower folding rod, the second lower folding rod, the third lower folding rod and the fourth lower folding rod, and the lower connecting member is configured to restrict the four lower folding rods to rotate only downward. During unfolding, the lower folding rods rotate upward about the bottom fixing members and the lower connecting member until the rods are horizontal to form a lower loading platform. The lower connecting member restricts the rods to rotate only downward, ensuring that the lower loading platform after unfolding does not deform downward due to loading. During folding, the lower loading platform is pulled downward, the rods rotate downward and collapse about the lower connecting member to fit snugly against the bottoms of the main rods. Similar to the upper folding rod assembly, the unidirectional limit design of the lower connecting member prevents the lower loading platform from collapse under load, ensuring the loading stability. In addition, the lower folding rod assembly is directly connected to the bottom fixing members, and can transfer the weight of items on the lower loading platform to the bottoms of the main rods, reducing stress on the middle of the main rods and extending the service life of the main rods.

In some embodiments, an extension folding rod assembly is arranged on outer sides of the two rear main rods. The extension folding rod assembly includes extension main rods that are pivotally connected to the two bottom fixing members, the extension main rods are externally provided with clamping members capable of sliding up and down along rod walls of the extension main rods, notches are formed on the clamping members, and the clamping members are snapped onto the outer sides of the rear main rods. To extend a load space, the extension main rods rotate outward to a position perpendicular to the rear main rods. When the extension is no longer needed, the extension main rods are rotated inward to enable them to fit snugly against the rear main rods. The slidable clamping members cause the notches to snap onto the rear main rods, securing the extension main rods and the rear main rods in place. The clamping members allow for quick fixation and removal of the extension main rods, flexibly extends the load length to adapt to longer items. The extension main rods can fit snugly against the rear main rods, without increasing additional storage space, and ensuring flexibility and convenience of storage.

In some embodiments, the extension folding rod assembly further includes a second extension folding sub-rod and a fourth extension folding sub-rod that are pivotally connected to tops of the two extension main rods, as well as a first extension folding sub-rod and a third extension folding sub-rod that are pivotally connected to the two clamping members. After the extension main rods are unfolded, the second extension folding sub-rod and the fourth extension folding sub-rod are rotated, and the first extension folding sub-rod and the third extension folding sub-rod are pulled simultaneously, such that two sets of sub-rods are engaged to form a support for the extended loading platform. During folding, the sub-rods are first rotated to collapse, the clamping members are then removed, and the extension main rods are rotated to fit snugly against the rear main rods, the extension folding sub-rods cooperate with the extension main rods to form a complete extended loading platform, avoiding the problem of lack of support caused by presence of only extension main rods, and ensuring that the extended loading platform can carry the items stably. The sub-rods can be folded synchronously with the extended main rods, making the wagon easy to operate and compact to collapse.

In some embodiments, the first extension folding sub-rod and the third extension folding sub-rod, as well as the second extension folding sub-rod and the fourth extension folding sub-rod are connected in a V-shape respectively; the first extension folding sub-rod and the second extension folding sub-rod, as well as the third extension folding sub-rod and the fourth extension folding sub-rod are pivotally riveted by rivets in a crossing manner respectively. The V-shaped connections enable the extension folding sub-rods to form a central support after unfolding, and the crossing pivotal riveting ensures that the sub-rods can rotate about the rivets. During unfolding, the two sets of crossing sub-rods rotate synchronously to be horizontal to form a stable extended support surface. During folding, the sub-rods rotate about the pivot joints and the connection points to collapse to fit snugly against the extension main rods. The V-shaped connection and the crossing pivotal riveting not only enhance the supporting strength of the extended folding sub-rods, avoid the extended part from bending due to load-bearing, but also ensures the flexibility of the sub-rods when folding to prevent jamming. In addition, the crossing structure can distribute the force of the extended loading platform and improve the overall load-bearing stability.

Figure 1:
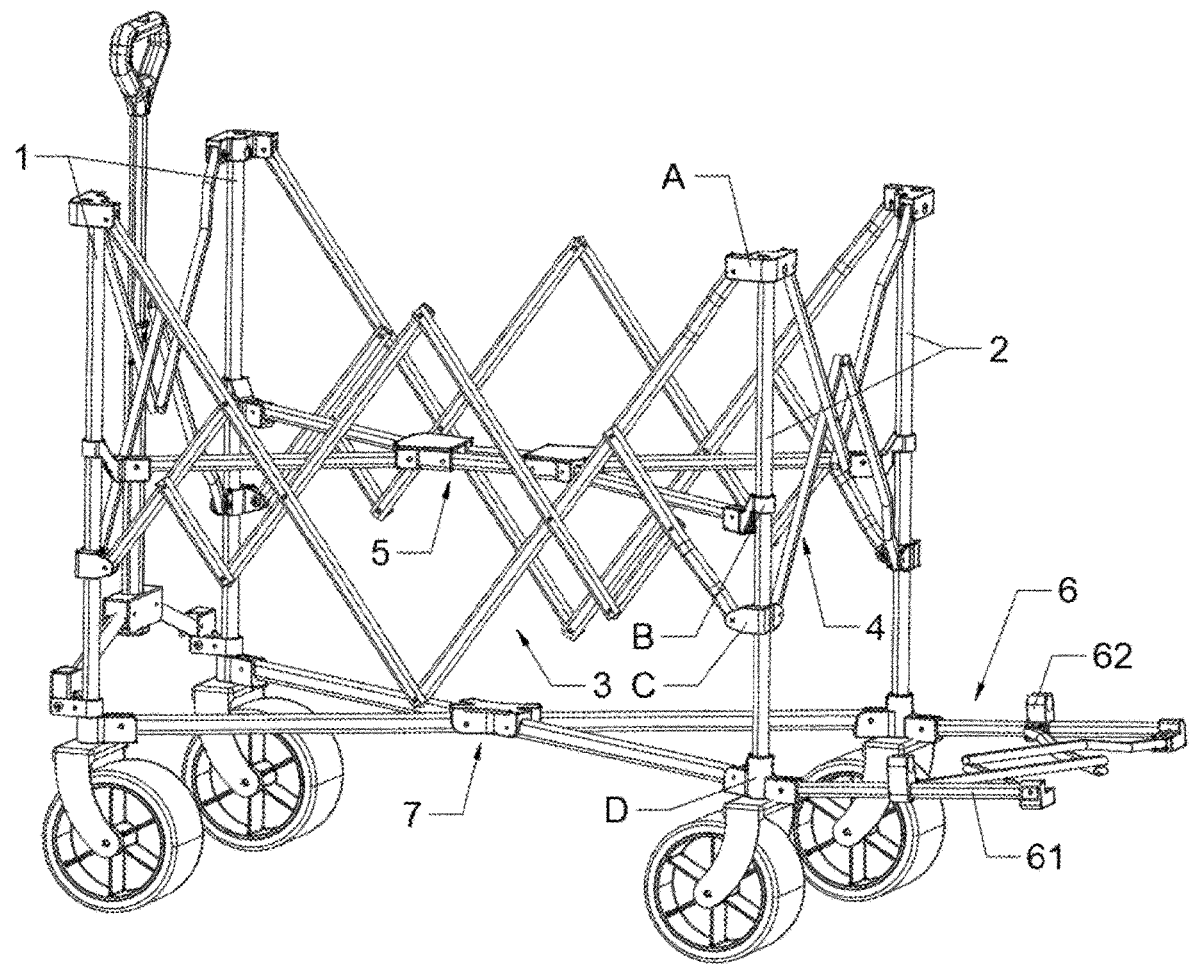
FIG. 1 is a schematic structural diagram of a separable liftable double-deck wagon according to the present disclosure in an unfolded state.

Reference numerals in the accompanying drawings:
1. front main rod; 2. rear main rod; A. top fixing member; B. fixing connecting member; C. slidable connecting member; D. bottom fixing member; 3. front-rear folding rod assembly; 31. first front-rear folding rod; 32. second front-rear folding rod; 33. third front-rear folding rod; 34. fourth front-rear folding rod; 35. fifth front-rear folding rod; 36. sixth front-rear folding rod; 37. seventh front-rear folding rod; 38. eighth front-rear folding rod; 4. side folding rod assembly; 41. first side folding rod; 42. second side folding rod; 43. third side folding rod; 44. fourth side folding rod; 5. upper folding rod assembly; 51. first upper folding rod; 52. second upper folding rod; 53. third upper folding rod; 54. fourth upper folding rod; 55. upper connecting member; 6. extension folding rod assembly; 61. extension main rod; 62. clamping member; 63. first extension folding sub-rod; 64. second extension folding sub-rod; 65. extension folding sub-rod; 66. fourth extension folding sub-rod; 7. lower folding rod assembly; 71. first lower folding rod; 72. second lower folding rod; 73. third lower folding rod; 74. fourth lower folding rod; and 75. lower connecting member.

DESCRIPTION OF EMBODIMENTS

The technical solutions in the embodiments of the present disclosure are described below clearly and comprehensively in conjunction with the accompanying drawings in the embodiments of the present disclosure. It is obvious that the embodiments described are merely a part of, not all of, embodiments of the present disclosure. All other embodiments obtained by those of ordinarily skilled in the art based on the embodiments of the present disclosure without making creative efforts fall within the scope of protection of the present disclosure.

Referring to FIG. 1, the present disclosure provides a technical solution: a separable liftable double-deck wagon. The wagon includes two front main rods 1 and two rear main rods 2, the four main rods together define a rectangular accommodating space, a top fixing member A and a bottom fixing member D are respectively fixed at top and bottom of each main rod, and each main rod is further fixedly provided with a fixing connecting member B. In order to ensure the foldability of the wagon, a slidable connecting member C capable of sliding up and down along a rod wall of each of the main rods is sleeved on each main rod. In order to provide two layers of accommodating spaces, an upper accommodating space, an upper accommodating space is defined between a plane formed by the four top fixing members A and a plane formed by the four fixing connecting members B, a bottom of the space is an upper folding rod assembly 5, a fabric sleeve is placed on the upper folding rod assembly 5, and four corners of the fabric sleeve are respectively sleeved on the four top fixing members A. Consequently, a lower accommodating space is defined between the plane formed by the four fixing connecting members B and a plane formed by the four bottom fixing members D, a fabric sleeve is placed on a lower folding rod assembly 7, and four corners of the fabric sleeve are sewn and fixed to the four slidable connecting members C. To ensure that the fabric sleeves do not interfere during folding, the lower fabric sleeve is made of a relatively soft perforated mesh pocket. To allow the wagon to be foldable and to ensure structural stability after unfolding, the four main rods are connected to each other by rotatable folding rod assemblies. Specifically, the folding rod assembly among the front main rods 1 and the rear main rods 2 is a front-rear folding rod assembly 3, and the folding rod assembly between the two front main rods 1 is a side folding rod assembly 4. In addition, the lower accommodating space needs to accommodate some elongated items such as surfboards, a storage length in a horizontal direction thus needs to be extended, to this end, an extension folding rod assembly 6 is arranged on outer sides of the two rear main rods 2 on one side.

Figure 2:
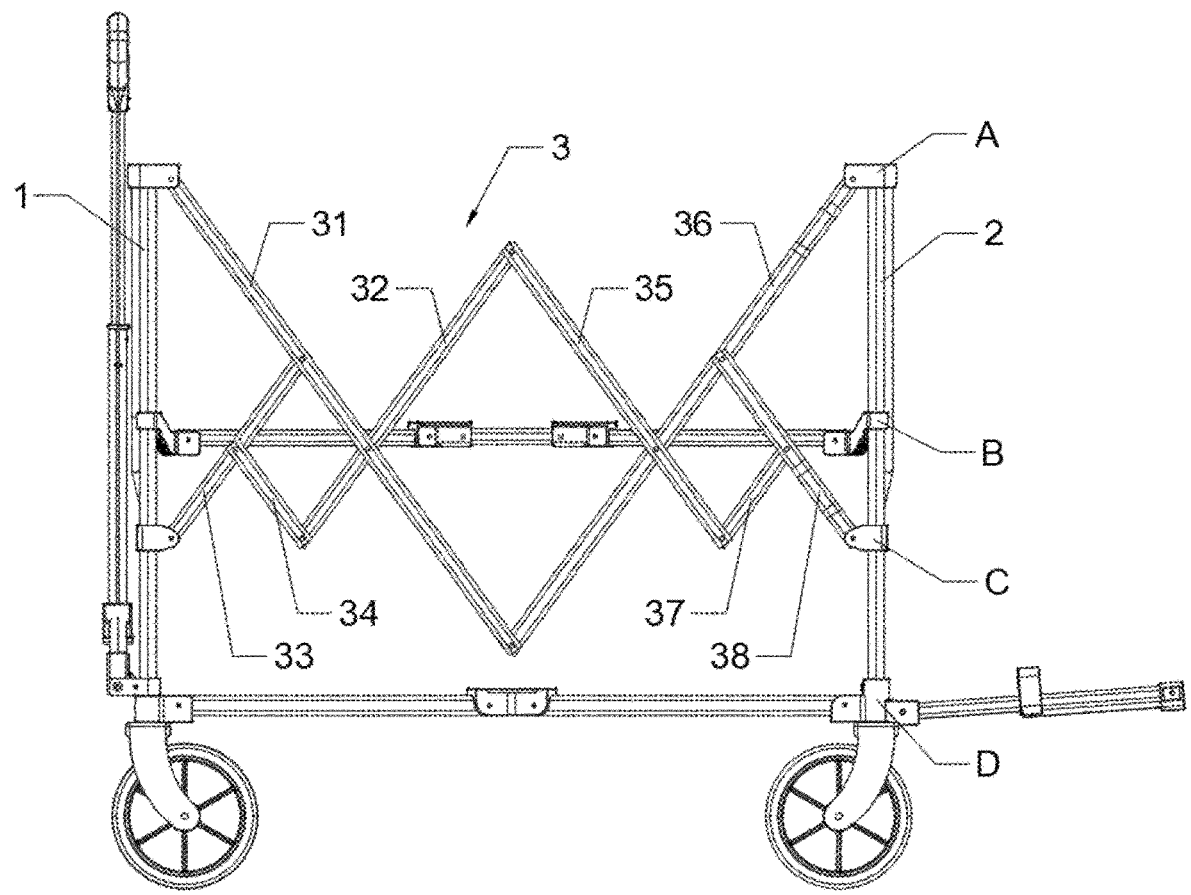
FIG. 2 is a schematic structural diagram of a separable liftable double-deck wagon according to the present disclosure from a front view.

Referring to FIGS. 1 and 2, the front-rear folding rod assembly 3 includes a first front-rear folding rod 31 and a sixth front-rear folding rod 36 respectively connected to the two top fixing members A, and bottoms of the first front-rear folding rod 31 and the sixth front-rear folding rod 36 are pivotally riveted by rivets. The front-rear folding rod assembly further includes a third front-rear folding rod 33 and an eighth front-rear folding rod 38 respectively connected to the slidable connecting members C. The other end of the third front-rear folding rod 33 is pivotally riveted by a rivet to the first front-rear folding rod 31, and similarly, the other end of the eighth front-rear folding rod 38 is pivotally riveted by a rivet to the sixth front-rear folding rod 36. Middle sections of the third front-rear folding rod 33 and the eighth front-rear folding rod 38 are further pivotally riveted by rivets to a fourth front-rear folding rod 34 and a seventh front-rear folding rod 37, respectively, the other end of the fourth front-rear folding rod 34 and the other end of the seventh front-rear folding rod 37 are pivotally riveted a second front-rear folding rod 32 and a fifth front-rear folding rod 35, respectively, and top ends of the second front-rear folding rod 32 and the fifth front-rear folding rod 35 are pivotally riveted together by a rivet. During folding, the slidable connecting members C move downward, causing the third front-rear folding rod 33 and the fourth front-rear folding rod 34, as well as the seventh front-rear folding rod 37 and the eighth front-rear folding rod 38 to move toward one another, and the fourth front-rear folding rod 34 and the second front-rear folding rod 32, as well as the seventh front-rear folding rod 37 and the fifth front-rear folding rod 35 are driven to move toward one another, and the second front-rear folding rod 32 and the fifth front-rear folding rod 35, as well as the first front-rear folding rod 31 and the sixth front-rear folding rod 36 are then driven to move toward one another. In this process, heights of the top fixing members A remain unchanged. Therefore, a top of the wagon does not rise during folding. Conversely, when a spacing between the front-rear folding rods increases, the wagon is in an unfolding process, during this process, the slidable connecting members C move upward, while the heights of the top fixing members A still remain unchanged.

Figure 3:
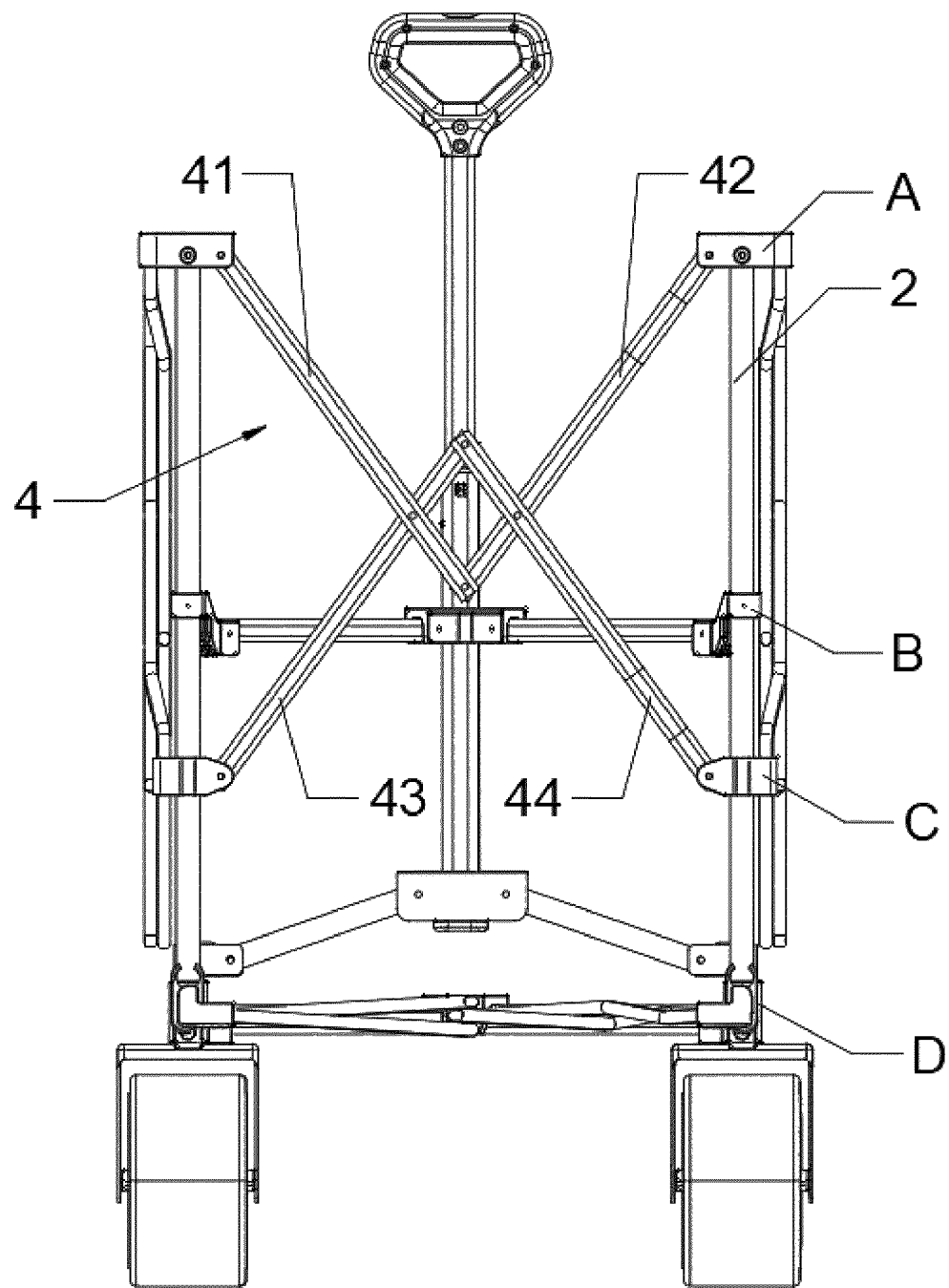
FIG. 3 is a schematic structural diagram of a separable liftable double-deck wagon according to the present disclosure from a right view.

Referring to FIGS. 1 and 3, the side folding rod assembly 4 includes a first side folding rod 41 and a second side folding rod 42 respectively connected to the two top fixing members A, and a third side folding rod 43 and a fourth side folding rod 44 respectively connected to two slidable connecting members C. Bottoms of the first side folding rod 41 and the second side folding rod 42 are pivotally riveted together by rivets, and tops of the third side folding rod 43 and the fourth side folding rod 44 are pivotally riveted together by rivets. The first side folding rod 41 and the third side folding rod 43, as well as the second side folding rod 42 and the fourth side folding rod 44 are also pivotally riveted. During folding, the slidable connecting members C move downward, causing the first side folding rod 41 and the second side folding rod 42, as well as the third side folding rod 43 and the fourth side folding rod 44 to move toward one another. In this process, the heights of the top fixing members A remain unchanged. Therefore, during folding, the top of the wagon does not rise. Conversely, when the spacing between the side folding rods increases, the wagon is in an unfolding process, during this process, the slidable connecting members C move upward, while the heights of the top fixing members A still remain unchanged.

Figure 4:
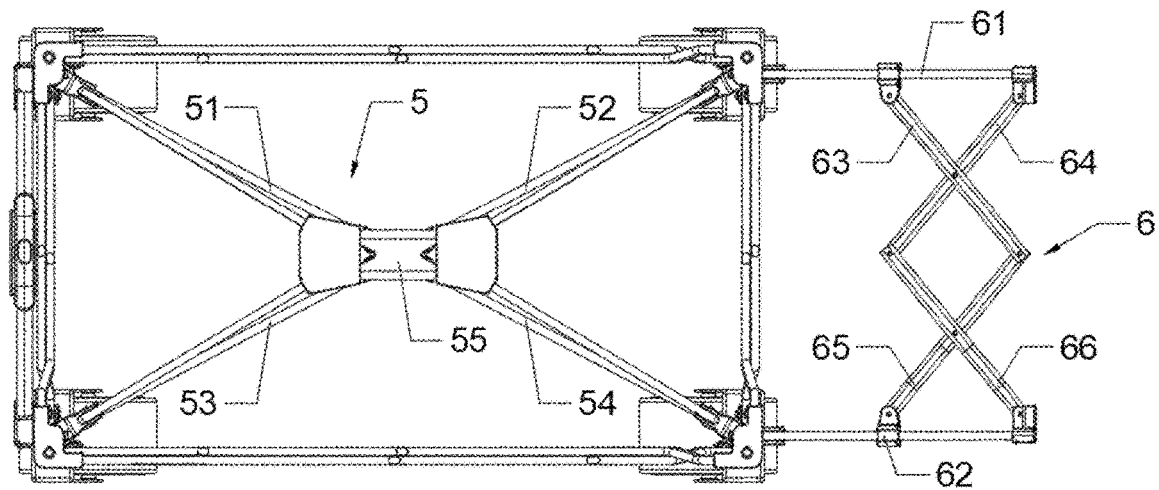
FIG. 4 is a schematic structural diagram of a separable liftable double-deck wagon according to the present disclosure from a top view.

Referring to FIGS. 1 and 4, the upper folding rod assembly 5 includes a first upper folding rod 51, a second upper folding rod 52, a third upper folding rod 53, and a fourth upper folding rod 54 that are respectively connected to the four fixing connecting members B, and the other end of each of the four upper folding rods is respectively connected to one respective corner of an upper connecting member 55. In order to prevent the wagon from collapsing when in use, the upper connecting member 55 is configured to move upward only and not downward. During folding, the upper connecting member 55 is simply lifted upward to bring the other ends of the four upper folding rods together.

Figure 5:
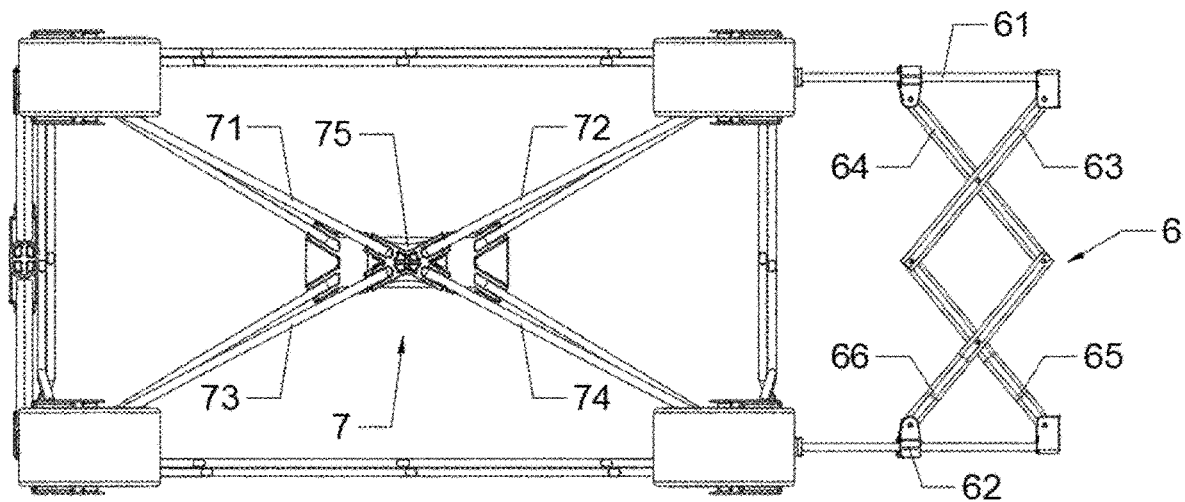
FIG. 5 is a schematic structural diagram of a separable liftable double-deck wagon according to the present disclosure from a bottom view.
Figure 6:
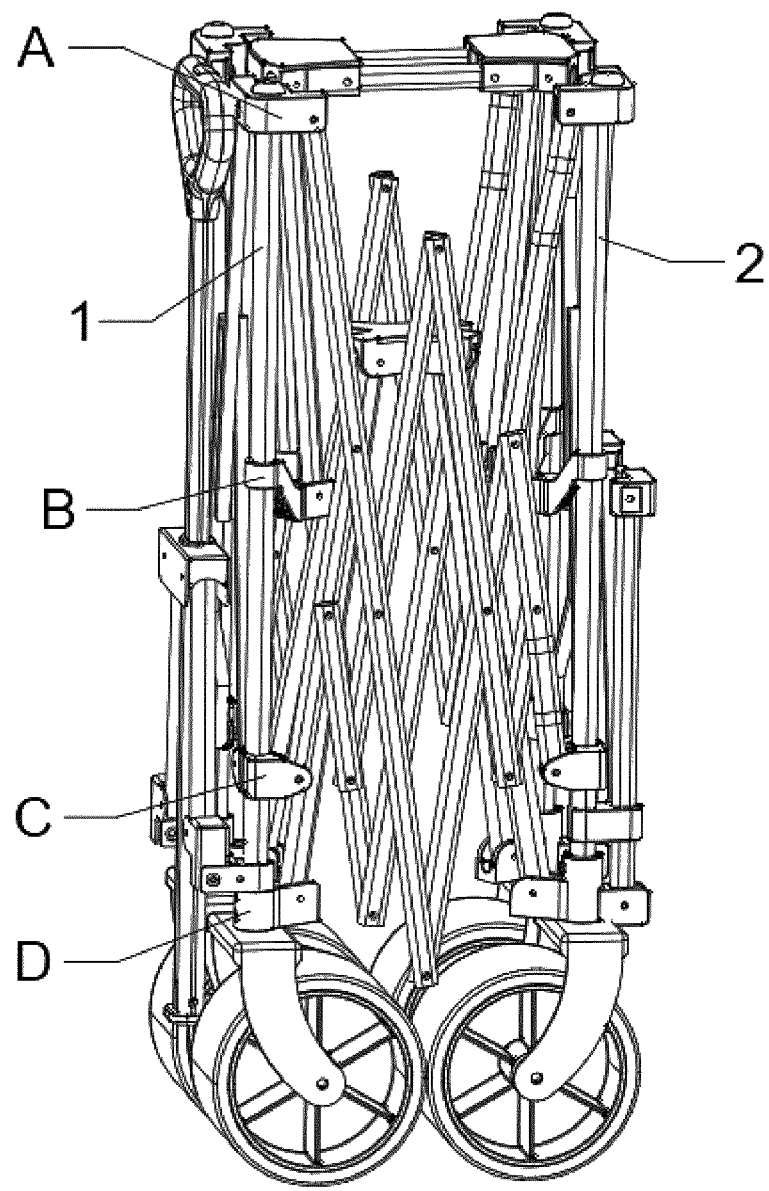
FIG. 6 is a schematic structural diagram of a separable liftable double-deck wagon according to the present disclosure in a folded state.

Referring to FIGS. 1 and 5, the lower folding rod assembly 7 includes a first lower folding rod 71, a second lower folding rod 72, a third lower folding rod 73, and a fourth lower folding rod 74 that are respectively connected to the four bottom fixing members D, and one end of each of the four upper folding rods is respectively connected to one corner of a lower connecting member 75. In order to prevent the wagon from collapsing when in use, the lower connecting member 75 is configured to move upward only and not downward. During folding, the lower connecting member 75 is simply lifted upward to bring the other ends of the four lower folding rods together.

Referring to FIGS. 1, 4, and 5, the extension folding rod assembly 6 includes extension main rods 61 connected to the bottom fixing members D of the two rear main rods 2. Slidable clamping members 62 are respectively sleeved on the two extension main rods 61, outer ends of the extension main rods 61 are respectively connected to a first extension folding sub-rod 63 and a third extension folding sub-rod 65, the other ends of the first extension folding sub-rod 63 and the third extension folding sub-rod 65 are pivotally riveted together by a rivet. The two clamping members 62 are respectively connected to a second extension folding sub-rod 64 and a fourth extension folding sub-rod 66, the other ends of the second extension folding sub-rod 64 and the fourth extension folding sub-rod 66 are pivotally riveted together by a rivet. The first extension folding sub-rod 63 and the second extension folding sub-rod 64, as well as the third extension folding sub-rod 65 and the fourth extension folding sub-rod 66 are pivotally cross-connected. The clamping members 62 are further provided with notches, which can be snapped onto the rear main rods 2 during collapsing.

Referring to FIGS. 1-6, the working principle and use process of the present disclosure are as follows:

To unfold the wagon, the slidable connecting members C are pushed upward, the third front-rear folding rod 33 and the eighth front-rear folding rod 38 of the front-rear folding rod assembly, as well as the third side folding rod 43 and the fourth side folding rod 44 of the side folding rod assembly are accordingly driven to rotate upward, this in turn drives other cross-connected folding rods, that is, the second front-rear folding rod 32, the fifth front-rear folding rod 35, the first side folding rod 41, and the second side folding rod 42, to unfold, thereby forming a rigid supporting structure. To fold the wagon, the slidable connecting members C are pulled downward, and the folding rods move together along the movable pivot joints. Since the top fixing members A are fixed to the main rods, the top of the wagon does not rise during folding, thereby reducing a storage space. The fixed connecting members B remain stable, the four folding rods of the upper folding rod assembly 5 unfold under their own rigidity, and the upper connecting member 55 can move only upward to support the upper fabric sleeve to form an upper loading space. Similarly, the lower folding rod assembly 7 unfolds under unidirectional limit of the lower connecting member 75 to support the lower perforated mesh pocket to form a lower loading space. During folding, the upper connecting member 55 and lower connecting member 75 are lifted upward to drive the four folding rods to move toward a center, completing the collapse of the upper and lower loading structures. When a loading length needs to be extended, the clamping members 62 are disengaged from the rear main rod 2, the clamping members 62 slide along the extension main rods 61 to drive the first extension folding sub-rod 63, the third extension folding sub-rod 65, the second extension folding sub-rod 64, and the fourth extension folding sub-rod 66 to unfold about the crossed pivot joints, forming an extended supporting structure. For collapsing, the clamping members 62 slide in an opposite direction to bring the extension folding sub-rods together, the notches of the clamping member 62 are snapped onto the rear main rods 2, thereby fixing the extension structure with the main rods.

Specific unfolding method for each layer of the wagon is as follows:
  Unfolding of a main frame: taking out the wagon in a folded state, holding the top fixing members A of the front main rod 1 and the rear main rod 2 with both hands, and slowly pushing the slidable connecting members C upward until the slidable connecting members C slide to preset limiting positions on the main rods, which may be determined either by the positioning structure on the main rods or by the fully unfolded states of the folding rods. The front-rear folding rod assembly 3 and the side folding rod assembly 4 are now fully unfolded, forming a rectangular main frame support;
  unfolding of the upper and lower loading spaces: checking the upper folding rod assembly 5 to ensure that the four folding rods have naturally unfolded under the cooperation of the fixed connecting members B and the upper connecting members 55, inserting the four corners of the upper fabric sleeve into the four top fixing members A, respectively, and smoothing out the fabric sleeve; checking the lower folding rod assembly 7 to ensure that the four folding rods have unfolded under the cooperation of the bottom fixing members D and the lower connecting members 75, and adjusting and smoothing out the four corners of the lower perforated mesh pocket into place to ensure that the perforated mesh pocket is free of folds; and
  unfolding of the extension structure: holding the clamping members 62 on the outer sides of the rear main rods 2 when long-sized items such as surfboards need to be loaded, detaching the notches by prying from the rear main rods 2, sliding the clamping members 62 in an direction of the extension main rods 61 away from the main rods; and during this process, the first extension folding sub-rod 63, the third extension folding sub-rod 65, the second extension folding sub-rod 64 and the fourth extension folding sub-rod 66 unfold gradually with the sliding of the clamping members until the extension folding rod assembly 6 is fully unfolded and the clamping members 62 slide to the limiting positions of the extension main rods 61, in which case, an extension area forms a stable support for loading.

The loading method of each layer of the wagon is as follows:
  Lower-layer loading: placing heavier or larger items such as toolboxes and storage boxes into the lower perforated mesh pocket. The breathability and flexibility of the perforated mesh pocket make it suitable for irregularly shaped items while preventing excessive shaking during transport;
  upper-layer loading: placing lighter items or items requiring categorized such as clothes or small accessories into the upper fabric sleeve. The fabric sleeve is fixed by the top fixing members A, providing strong loading stability. A separate space from the lower layer is formed to prevent the items from being squeezed against each other; and
  extension-area loading: placing one ends of long items such as surfboards or fishing rods in the loading area of the main frame, and placing the other ends thereof on the extension support area formed by the extension folding rod assembly 6 to ensure stable support at both ends of the item, and avoid a shift in gravity caused by one end being suspended during transport.

The folding and collapsing method of the wagon is as follows:
  Unloading of items: removing all items from the upper, lower, and extension areas to avoid jamming or damage of the items during folding;
  collapsing of the extension structure: sliding the clamping members 62 along the extension main rods 61 toward the rear main rods 2, driving the extension folding sub-rods to move toward the center until the extension folding rod assembly 6 is fully collapsed, and aligning the notches of the clamping members 62 with the rear main rods 2 and snapping onto the main rods, thereby fixing the extension structure with the main rod to prevent loosening;
  collapsing of the upper and lower loading structures: gently lifting the upper connecting members 55 upward, and bringing the first upper folding rod 51 and the fourth upper folding rod 54 together toward the center to collapse the upper structure; similarly, lifting the lower connecting members 75 to collapse the lower folding rod assembly 7; and removing the upper fabric sleeve from the top fixing members A, or folding it together with the collapsing structure; and
  collapsing of the main frame: holding the slidable connecting members C with both hands to pull them downward slowly, and driving the front-rear folding rod assembly 3 and the side folding rod assembly 4 to move toward the pivot joints until the slidable connecting members C reach the bottoms of the main rods near the bottom fixing members D, to enable the wagon to collapse into a compact state, suitable for storage in corners, storage rooms, or other narrow spaces. Since the top of the wagon does not rise after folding, no additional vertical space is required.

The separable liftable double-deck wagon is driven by sliding members and a plurality of linked folding rod assemblies to realize folding storage and unfolding support. The front main rods 1 and the rear main rods 2 serve as fixed support shafts. The slidable connecting members C slide up and down along the rod walls of the main rods, driving the front-rear folding rod assembly 3, the side folding rod assembly 4, the upper folding rod assembly 5, and the lower folding rod assembly 7 to rotate for folding or unfolding. In addition, the loading length is extended by extending detachable linkage of the extension folding rod assembly 6. Throughout the folding process, the heights of the top fixing members A remain unchanged, preventing an increase in storage space. In addition, the unidirectional limit of the upper connecting member 55 and the lower connecting member 75 ensure load-bearing stability.

Finally, it should be noted that those skill in the art that the above is only a preferred embodiment of the present disclosure, and is not intended to limit the present disclosure. Although the present disclosure has been described in detail with reference to the above embodiment, for those skilled in the art, it is still apparent that the technical solutions described in the above embodiment may be modified, or some technical features thereof may be equivalently replaced. Any modification, equivalent replacement, improvement, etc. made within the spirit and principle of the present disclosure shall fall within the protection scope of the present disclosure.

What is claimed is:

1. A separable liftable double-deck wagon, comprising: two front main rods and two rear main rods, wherein the four main rods together define a rectangular space; top fixing members are fixed at tops of the front main rods and the rear main rods, and bottom fixing members are fixed at bottoms of the front main rods and the rear main rods; fixed connecting members and slidable connecting members are sequentially arranged from top to bottom on the front main rods and the rear main rods, and the slidable connecting members are configured to slide up and down along rod walls of the front main rods and the rear main rods;
   a front-rear folding rod assembly is arranged between the front main rods and the rear main rods, wherein rod ends of the front-rear folding rod assembly are pivotally connected to the top fixing members and the slidable connecting members, respectively, one respective side folding rod assembly is arranged between the two front main rods and between the two rear main rods, and rod ends of the side folding rod assembly are pivotally connected to the top fixing members and the slidable connecting members, respectively; and
   an upper folding rod assembly and a lower folding rod assembly are sequentially arranged from top to bottom in the rectangular space defined by the four main rods, wherein rod ends of the upper folding rod assembly are pivotally connected to the fixed connecting members, and rod ends of the lower folding rod assembly are pivotally connected to the bottom fixing members;
   wherein an extension folding rod assembly is arranged on outer sides of the two rear main rods; and the extension folding rod assembly comprises extension main rods that are respectively pivotally connected to the two bottom fixing members, each of the extension main rods is externally provided with a clamping member capable of sliding along rod walls of the extension main rods, and the clamping members are provided with notches and are configured to be snapped onto outer sides of the rear main rods.

2. The separable liftable double-deck wagon according to claim 1, wherein the front-rear folding rod assembly comprises a first front-rear folding rod and a sixth front-rear folding rod that are connected to the top fixing members, as well as a third front-rear folding rod and an eighth front-rear folding rod that are connected to the slidable connecting members; and the first front-rear folding rod and the sixth front-rear folding rod are connected in a V-shape, the third front-rear folding rod is pivotally riveted to the first front-rear folding rod, and the eighth front-rear folding rod is pivotally riveted to the sixth front-rear folding rod.

3. The separable liftable double-deck wagon according to claim 2, wherein the front-rear folding rod assembly further comprises a second front-rear folding rod that is connected to the first front-rear folding rod in an X-shape, and a fifth front-rear folding rod that is connected to the sixth front-rear folding rod in an X-shape with; and the second front-rear folding rod and the fifth front-rear folding rod are connected in an inverted V-shape, a fourth front-rear folding rod is pivotally riveted between the second front-rear folding rod and the third front-rear folding rod, and a seventh front-rear folding rod is pivotally riveted between the fifth front-rear folding rod and the eighth front-rear folding rod.

4. The separable liftable double-deck wagon according to claim 1, wherein the side folding rod assembly comprises a first side folding rod and a second side folding rod that are connected to the top fixing members, as well as a third side folding rod and a fourth side folding rod that are connected to the slidable connecting members.

5. The separable liftable double-deck wagon according to claim 4, wherein the first side folding rod and the second side folding rod are connected in a V-shape, the third side folding rod and the fourth side folding rod are connected in an inverted V-shape, the first side folding rod and the third side folding rod are connected in an X-shape, and the second side folding rod and the fourth side folding rod are connected in an X-shape.

6. The separable liftable double-deck wagon according to claim 1, wherein the upper folding rod assembly comprises a first upper folding rod, a second upper folding rod, a third upper folding rod; and a fourth upper folding rod that are pivotally connected to one respective fixed connecting member, and an upper connecting member is arranged at an intersection center of the first upper folding rod, the second upper folding rod, the third upper folding rod, and the fourth upper folding rod, and the upper connecting member is configured to restrict the four upper folding rods to rotate only downward.

7. The separable liftable double-deck wagon according to claim 1, wherein the lower folding rod assembly comprises a first lower folding rod, a second lower folding rod, a third lower folding rod, and a fourth lower folding rod that are pivotally connected to a respective bottom fixing member; and a lower connecting member is arranged at an intersection center of the first lower folding rod, the second lower folding rod, the third lower folding rod, and the fourth lower folding rod, and the lower connecting member is configured to restrict the four lower folding rods to rotate only downward.

8. The separable liftable double-deck wagon according to claim 1, wherein the extension folding rod assembly further comprises a second extension folding sub-rod and a fourth extension folding sub-rod that are pivotally connected to tops of the two extension main rods respectively, as well as a first extension folding sub-rod and a third extension folding sub-rod that are pivotally connected to the two clamping members.

9. The separable liftable double-deck wagon according to claim 8, wherein the first extension folding sub-rod and the third extension folding sub-rod are connected in a V-shape, and the second extension folding sub-rod and the fourth extension folding sub-rod are connected in a V-shape; and the first extension folding sub-rod and the second extension folding sub-rod are pivotally cross-connected by rivets, and the third extension folding sub-rod and the fourth extension folding sub-rod are pivotally cross-connected by rivets.

\* \* \* \* \*